(12) United States Patent
Lange

(10) Patent No.: US 10,358,018 B2
(45) Date of Patent: Jul. 23, 2019

(54) VEHICLE DOOR

(71) Applicant: GM GLOBAL TECHNOLOGY OPERATIONS LLC, Detroit, MI (US)

(72) Inventor: Marcus Lange, Ruesselsheim (DE)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 133 days.

(21) Appl. No.: 15/468,566

(22) Filed: Mar. 24, 2017

(65) Prior Publication Data

US 2017/0274742 A1 Sep. 28, 2017

(30) Foreign Application Priority Data

Mar. 24, 2016 (DE) .................. 10 2016 003 729

(51) Int. Cl.
*B60J 5/04* (2006.01)

(52) U.S. Cl.
CPC ............ *B60J 5/0426* (2013.01); *B60J 5/042* (2013.01); *B60J 5/0402* (2013.01); *B60J 5/0406* (2013.01); *B60J 5/0408* (2013.01); *B60J 5/0411* (2013.01); *B60J 5/0412* (2013.01); *B60J 5/0481* (2013.01)

(58) Field of Classification Search
CPC ............................... B60J 5/0426; B60J 5/0411
See application file for complete search history.

(56) References Cited

U.S. PATENT DOCUMENTS

| | | |
|---|---|---|
| 6,086,139 A | 7/2000 | Heim et al. |
| 2005/0001448 A1 | 1/2005 | Omori et al. |
| 2007/0199248 A1 | 8/2007 | Rieder et al. |
| 2007/0267889 A1 | 11/2007 | Flendrig et al. |
| 2009/0056230 A1* | 3/2009 | Flendrig ............... B60J 5/0405 49/502 |
| 2017/0136856 A1* | 5/2017 | Sugie ..................... B60J 5/0411 |

FOREIGN PATENT DOCUMENTS

| | | | |
|---|---|---|---|
| DE | 3816347 A1 | 11/1989 | |
| DE | 19962988 A1 | 5/2000 | |
| DE | 19936175 A1 | 2/2001 | |
| DE | 10038200 A1 * | 2/2002 | ............ B60J 5/0426 |
| DE | 10038200 A1 | 2/2002 | |
| DE | 10060945 A1 | 6/2002 | |
| DE | 102005061562 A1 | 7/2007 | |
| DE | 102008026995 A1 | 12/2009 | |
| DE | 102014117063 A1 | 5/2016 | |
| JP | 59114129 A * | 7/1984 | ............ B60J 5/0411 |

OTHER PUBLICATIONS

German Patent Office, German Search Report for Country Application No. 10 2016 003 729.6, dated Dec. 2, 2016.
Great Britain Patent Office, Great Britain Search Report for Great Britain Application No. 1703211.1, dated Aug. 25, 2017.

* cited by examiner

Primary Examiner — Marcus Menezes
(74) Attorney, Agent, or Firm — Lorenz & Kopf, LLP

(57) ABSTRACT

A vehicle door includes a door box with first and second walls and a second wall and a window frame module, in which a window frame, a first window shaft reinforcement and a second window shaft reinforcement are connected into a structural unit. The first window shaft reinforcement features a groove that accommodates an upper edge of the first wall. An upper edge of the second wall is covered by the second window shaft reinforcement.

17 Claims, 3 Drawing Sheets

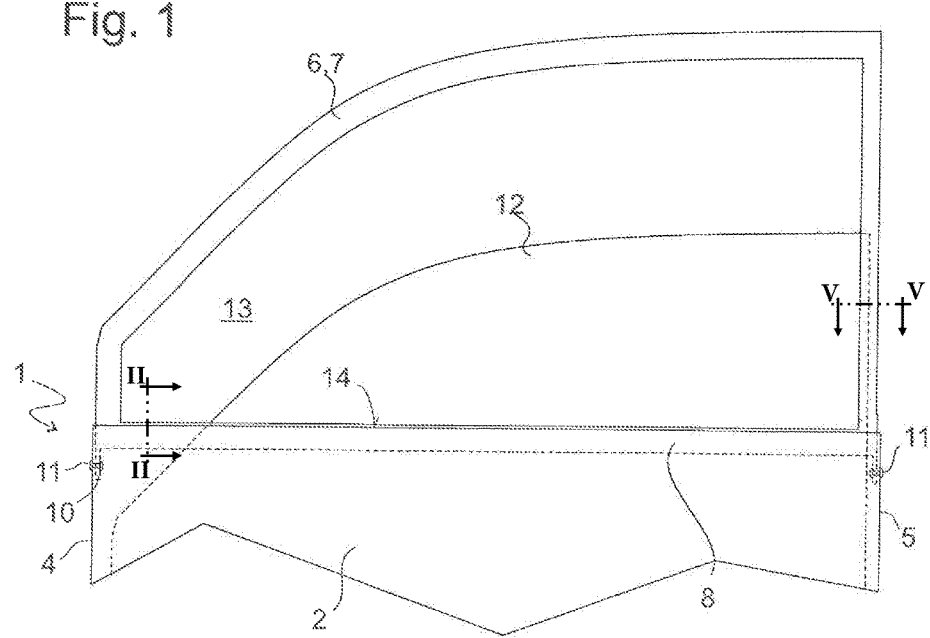
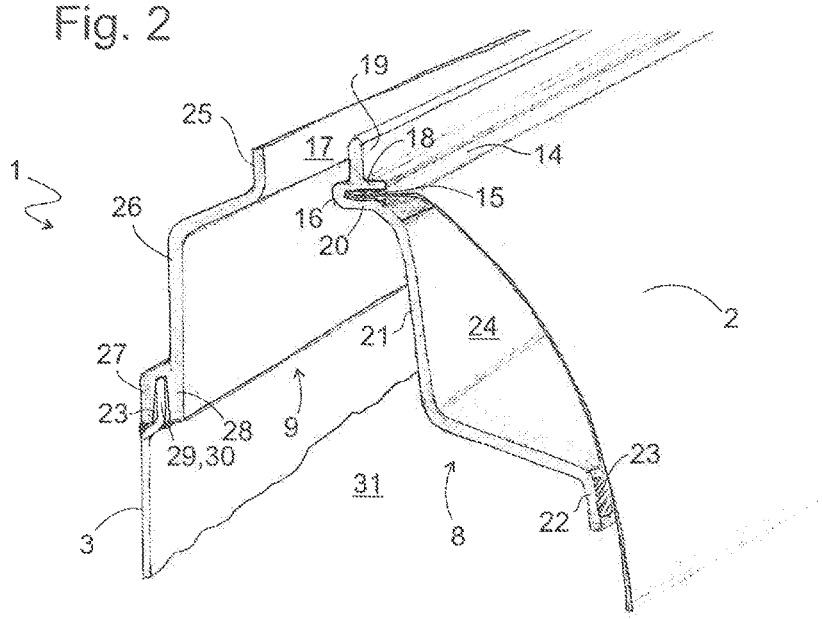

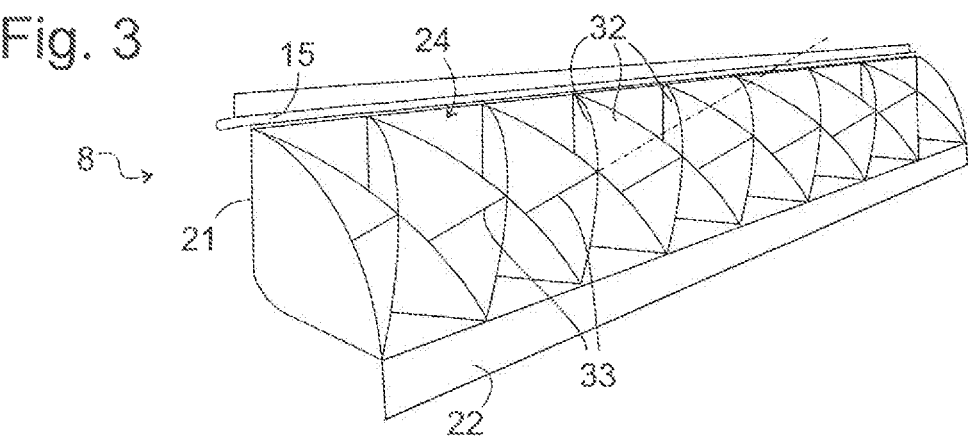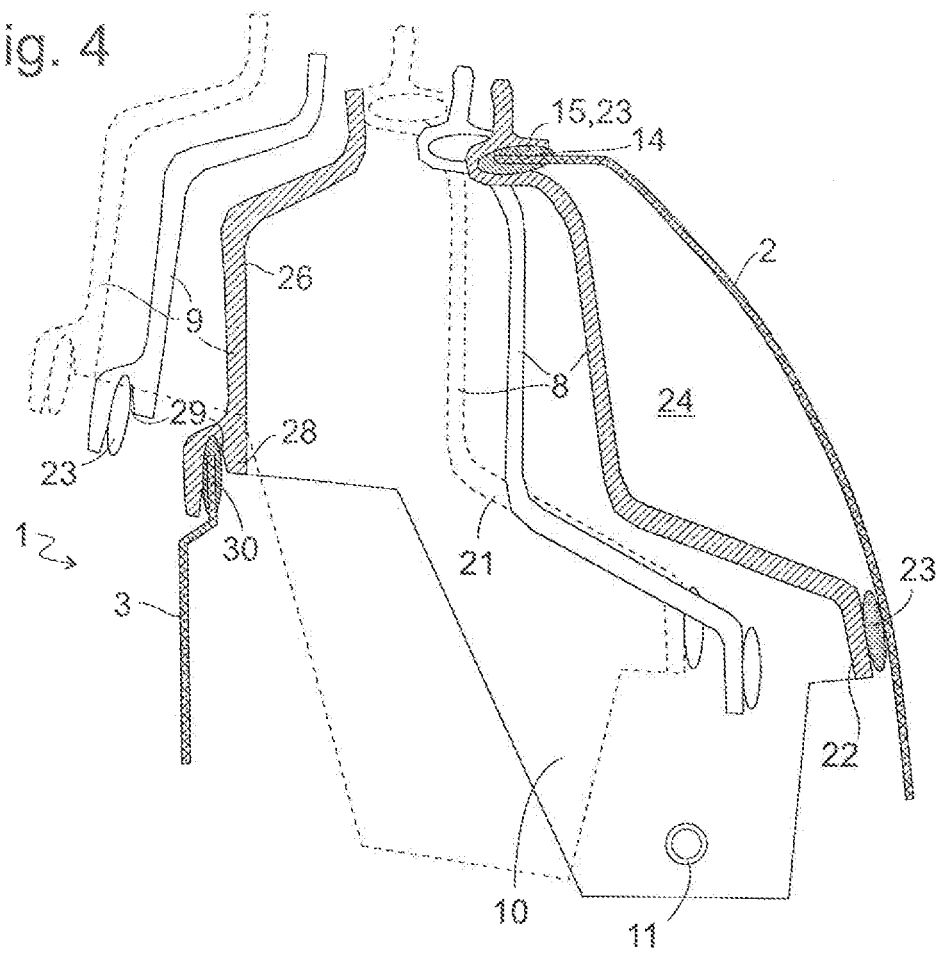

VEHICLE DOOR

CROSS-REFERENCE TO RELATED APPLICATION

This application claims priority to German Patent Application No. 102016003729.6, filed Mar. 24, 2016, which is incorporated herein by reference in its entirety.

TECHNICAL FIELD

The present disclosure relates to a vehicle body component, and more particularly to a vehicle door configuration.

BACKGROUND

DE 199 62 988 A1 discloses a vehicle door with a door box including a first wall and a second wall. A window frame module is inserted into a gap on the upper side of the door box and anchored therein during the assembly of the door box. An inner window shaft reinforcement is installed in the door box beforehand for stabilizing the door box for this purpose. However, if the door box lacks stability without the window shaft reinforcement, the problems to be prevented with the stabilization during the installation of the window frame module consequently would also interfere with the installation of the stabilizing component such that the problem of lacking stability ultimately is only shifted, but not solved.

Accordingly, there is a need in the art to develop a vehicle door that can be easily and cost-efficiently assembled.

SUMMARY

According to an embodiment of the present disclosure, a vehicle door with a door box includes first and second walls and a window frame module, in which a window frame, a first window shaft reinforcement and a second window shaft reinforcement are connected into a structural unit. The first window shaft reinforcement features a groove that accommodates an upper edge of the first wall and an upper edge of the second wall is covered by the second window shaft reinforcement.

Since, in accordance with the present disclosure, both window shaft reinforcements and the window frame are combined into a window frame module, all of these components can only be jointly connected to the door box in a single assembly step. After attachment of the first window shaft reinforcement, the other window shaft reinforcement and the window frame therefore are also in the intended installation position, even if potentially lacking rigidity of the door box complicates the installation of the window frame module, such that no stabilization is required in preparation for the installation of these components.

The first window shaft reinforcement can be easily positioned by attaching its groove on the upper edge of the first wall. A connection between the second wall and the second window shaft reinforcement can then be produced along the covered upper edge of the second wall. The connection to the second wall may also be produced by attaching a groove of the second window shaft reinforcement to its upper edge. The upper edge of the second wall may also be adhesively connected to an inner side of the second window shaft reinforcement. The two above-described options are preferably combined in that a sidewall of the groove is used as the inner side of the second window shaft reinforcement, to which the second wall is adhesively connected.

If the groove of the first window shaft reinforcement extends near an upper edge of this window shaft reinforcement, the first wall may furthermore be adhesively connected to a lower region of the first window shaft reinforcement at the greatest possible distance from the groove in order to thereby effectively stabilize the door box itself, as well as the seat of the window frame module on the door box. The upper edge of the first wall may lie higher than the upper edge of the second wall in order to simplify the insertion of a part of the first window shaft reinforcement into the door box. In order to ensure a stable seat of the window frame module, the upper edge of the second wall should in turn lie higher than the adhesively connected lower region of the first window shaft reinforcement.

In order to strengthen the first window shaft reinforcement—and therefore ultimately the entire vehicle door—the first window shaft reinforcement may feature a wall region, which defines an elongated hollow space together with the first wall, between the groove and the adhesively connected lower region, wherein ribs may be integrally molded on the wall region and protrude into the hollow space. The upper edge of the first wall may be secured in the groove of the first window shaft reinforcement by an adhesive connection.

It is preferred that the first wall forms an outer wall and the second wall forms an inner wall of the door. If the upper edge of the first wall lies higher than the upper edge of the second wall as described above, an exposed surface of the window frame module, which compensates the height difference, consequently is positioned on the inner side of the door facing the passenger compartment in an essentially weather-proof fashion whereas the upper edge of the outer wall can extend very close to the belt line of the door.

The window frame module may furthermore be fastened on the door box by rivets. These rivets are preferably set far apart from one another in end walls of the door box. In order to provide the window frame module with the greatest tilting stability possible despite potential tolerances, it should be fastened on end walls of the door box underneath the adhesively connected lower region by the rivets or otherwise.

The window frame module may be made of plastic in order to reduce its weight. High stability can be achieved with a small wall thickness if parts of the window frame module are made of a composite material such as Organo sheet material and the parts are integrally connected to one another by plastic injection-molded thereon; however, a one-piece injection-molded window frame module is less expensive.

In order to simplify the molding of the window frame module, the window shaft reinforcements may form a hollow space without undercuts that is open toward the interior of the door box.

BRIEF DESCRIPTION OF THE DRAWINGS

The present invention will hereinafter be described in conjunction with the following drawing figures, wherein like numerals denote like elements.

FIG. 1 shows a schematic representation of an exemplary embodiment for a vehicle door in accordance with the present disclosure;

FIG. 2 shows a cross section through walls of the door box and window shaft reinforcements of a window frame module fastened thereon as indicated by II-II in FIG. 1;

FIG. 3 shows a perspective representation of an outer window shaft reinforcement;

FIG. 4 shows an exemplary sequence of the installation of the window frame module on the door box.

DETAILED DESCRIPTION

Figure 5:
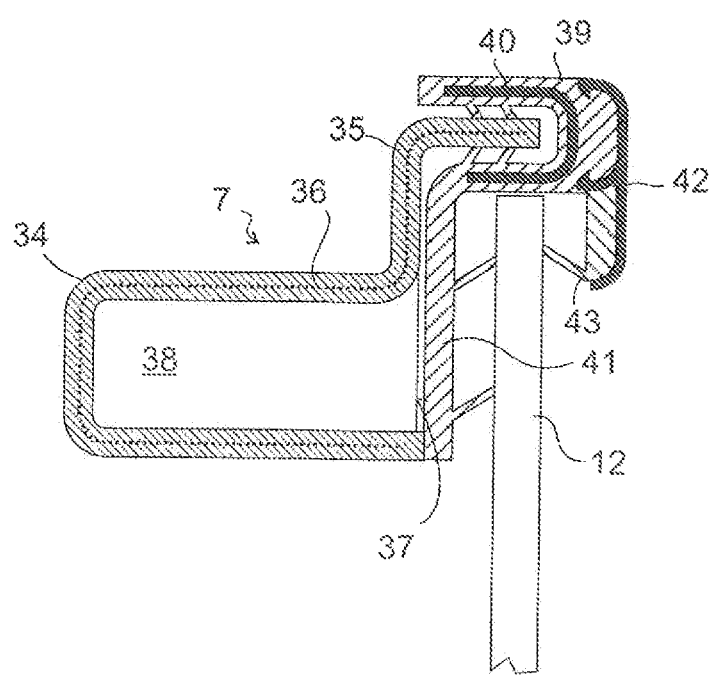
FIG. 5 shows a cross section through a window frame of the window frame module as indicated by V-V in FIG. 1.

The following detailed description is merely exemplary in nature and is not intended to limit the invention or the application and uses of the invention. Furthermore, there is no intention to be bound by any theory presented in the preceding background of the invention or the following detailed description.

FIG. 1 shows a schematic exterior view of an inventive vehicle door. The door conventionally includes a door box 1, of which only an outer wall 2 is visible in the perspective representation according to FIG. 1. The one-piece outer wall 2 is made of a flat material, typically of sheet steel, and forms the hollow door box 1 together with an inner wall 3 (see FIG. 2) that faces the passenger compartment in the installed state. The inner wall 3 conventionally features extensive openings, through which various components such as a window lifting mechanism can be installed in the door box 1, wherein the openings are concealed under a door trim on the finished vehicle.

The walls 2, 3 are connected to one another along their front, rear and lower edges. The inner wall 3 forms end faces 4, 5 of the door, which respectively face an A-column and a B-column of the vehicle in the installed state and on which a door hinge and a door lock are respectively anchored.

The walls 2, 3 are not connected along their upper edges. A window frame module 6 is inserted into the gap between the walls. The window frame module 6 includes a window frame 7 that extends around a window opening 13 above the door box 1 and two window shaft reinforcements 8, 9 that connect the lower ends of the window frame 7 to one another and define a gap, through which a window pane 12 can be lowered from the window opening 13 into the interior of the door box 1. The window pane is illustrated in a partially lowered position in FIG. 1. Likewise, an outer window shaft reinforcement 8 of the two window shaft reinforcements is shown in FIG. 1. Its upper edge extends slightly above an upper edge 14 of the outer wall 2 and is drawn with continuous lines in FIG. 1 because it is unobstructed; however, the majority of the window shaft reinforcement 8 is concealed behind the outer wall 2 in the interior of the door box 1, and therefore illustrated in the form of an outline drawn with broken lines in the figure.

On their front and rear ends, the window shaft reinforcements 8, 9 are connected to one another by end plates 10 that abut on the end faces 4, 5 of the door box 1 from inside. The end plates 10 protrude downward over a lower edge of the window shaft reinforcements 8, 9 and are fastened on the end faces 4, 5 in this protruding region by rivets 11.

The window shaft reinforcements 8, 9 define a gap, in which the window pane 12 illustrated in an intermediate position in FIG. 1 can be moved between a closed position, in which it engages into grooves of the window frame 7, and an open position, in which it is lowered into the door box 1.

FIG. 2 shows an upper part of the door box 1 partially in the form of a section in the transverse direction of the vehicle and partially in the form of a perspective view. The outer wall 2 is increasingly curved inward toward the top such that it extends almost horizontally on its upper edge 14 and engages into a groove 15 on the upper edge of the outer window shaft reinforcement 8. A bottom 16 of the groove 15 defines the aforementioned gap 17, through which the window pane 12 can be moved.

A web 19 protrudes upward from an upper wall 18 of the groove 15 and is provided for attaching a not-shown window seal thereto, wherein one side of the window seal rests against the window pane and its other side rests against the edge region of the wall 2 protruding from the groove 15 such that the outer window shaft reinforcement 8 is externally concealed by the window seal.

A wall region 21 initially extends steeply upward from a lower wall 20 of the groove 15 and is then sharply bent outward in order to ultimately transform into a flange 22 that abuts on the outer wall 2. The outer wall 2 and the outer window shaft reinforcement 8 are fastened on one another by two adhesive beads 23, one of which extends in the groove 15 and the other one of which extends along the flange 22. Between these two adhesive beads, the outer wall 2 and the wall region 21 define an elongated hollow space 24.

The inner window shaft reinforcement 9 lies opposite of the outer window shaft reinforcement 8 on the other side of the gap 17. A vertical web 25, to which the window seal can be attached, is also provided on the very top of this inner window shaft reinforcement. Toward the bottom, this web 25 is followed by a shoulder 26 that is largely exposed toward the vehicle interior. The lower end of the inner window shaft reinforcement 9 is formed by a groove 29 that is open toward the bottom and defined by walls 27, 28. The upper edge 30 of the inner wall 3 is fixed in the groove 29 in that it penetrates into an adhesive bead 23.

The window shaft reinforcements 8, 9 define a hollow space 31 that is open toward the bottom, i.e. into the door box 1, without undercuts. Consequently, a single rigid mold part suffices for forming the facing inner surfaces of the window shaft reinforcements 8, 9, which define the hollow space 31, and the groove 29. Two additional mold parts, which can be moved relative to the first mold part in the transverse direction of the vehicle, are required for forming the outer surfaces of the window shaft reinforcements 8, 9.

The window shaft reinforcements 8, 9 and the window frame 7 can be jointly injection-molded in one piece of plastic, preferably glass-reinforced plastic. However, they may also be largely formed of blanks of a composite material, particularly Organo sheet material, in that these blanks are draped in a cavity defined by the aforementioned mold parts and plastic is injected into the remaining cavities in order to thereby embed and integrally connect the blanks. On the outer window shaft reinforcement 8, for example, such a blank may extend from the web 19 as far as into the flange 22 such that only a part of the upper wall 18 has to be injection-molded thereon; with the exception of one of the walls 27, 28, the complete inner window shaft reinforcement 9 may be formed of such a blank.

FIG. 3 shows a modification of the outer window shaft reinforcement 8. In this case, the hollow space 24 between the wall region 21 and the outer wall 2 is not empty, but intersecting reinforcement ribs 32 rather are injection-molded on the wall region 21 and extend as far as the outer wall 2. The direction, in which a mold for forming the outer side of the wall region 21 and the reinforcement ribs 32 has to be removed from the window shaft reinforcement 8, is defined by the lines 33, along which the reinforcement ribs 32 intersect one another; in this case, the groove 15 is inclined downward toward the vehicle center parallel to this direction.

FIG. 4 illustrates the assembly of the vehicle door based on a schematic section through the upper part of the door box 1 and several sections through the window shaft reinforcements 8, 9. In the chronologically first of these sections drawn with broken lines, the flange 22 and a part of the wall region 21 of the outer window shaft reinforcement 8 and of the end plates 10 extend into the door box 1 through an opening defined by the upper edges 14, 30 of the walls 2, 3; the complete inner window shaft reinforcement 19 is still located outside the door box 1. In the second section drawn with continuous lines, the groove 15 of the outer window shaft reinforcement 8 is located on the edge 14. Since the entire window frame module 6 is pivoted about the edge 14 while the groove 15 is attached to the edge 14, an inner side of the inner wall 28 of the inner window shaft reinforcement 9 initially abuts on the upper edge 30. The shoulder 26 is elastic to such a degree that the wall 28 can be lifted over the edge 30. The edge 30 engages into the groove 29 as the shoulder 28 subsequently relaxes again. The window frame module 6 is provisionally secured due to the lock-in effect since the grooves 15, 29 are not parallel. It is definitively secured by the curing adhesive and by setting the rivets 11 between the end plates 10 and the end faces 4, 5 of the door box 1.

FIG. 5 shows a cross section through the window frame 7. The window frame 7 includes a section 34 with a channel-shaped cross section that is open toward the vehicle exterior and a section 35 with an L-shaped cross section that is connected to the upper limb of the channel-shaped section 34. A strip of fabric 36, e.g. of fiberglass, is embedded in the window frame 7. The illustrated cross section of the window frame 7 including the embedded fabric 36 may be produced by deep-drawing a blank of Organo sheet material as described above with reference to the window shaft reinforcements 8, 9; however, an extrusion technology may also be considered for the production, particularly in the form of so-called pultrusion, in which the fabric strip 36 is covered with thermoplastic matrix material on both sides in an extrusion tool and an endless profile with the cross section illustrated in the figure and the embedded fabric 36 is pulled out of a die of the extrusion tool, cut to the respectively required length and, if applicable, curved in order to be adapted to the shape of the window frame 7.

The channel-shaped section 34 is reinforced with ribs 37, which are injection-molded on its limbs that lie opposite of one another to both sides of a groove 38. This injection-molding may be carried out in the same production step as the deep-drawing of the window frame 7 of an Organo sheet material blank; however, if the window frame 7 is produced by extrusion, it is placed into a mold in its final shape in order to injection-mold the ribs 37, as well as integral connections to the window shaft reinforcements 8, 9, thereon in the same injection-molding process and to thereby produce the complete frame module 6.

A sealing profile 39 is attached to a free end of the L-profile section 35. The sealing profile 39 is an extruded profile of an easily deformable material, typically rubber. In order to ensure a rigid seat on the L-profile section 35 despite the easily deformable material, an elastic metal profile 40 of U-shaped cross section is embedded in the sealing profile 39 and keeps the sealing profile 39 pressed against the L-profile section 35 from both sides. One limb 41 of the sealing profile 39 covers the groove 38 and in turn forms a sidewall of a groove that is open toward the bottom and accommodates the upper edge of the window pane 12 in its closed position. A second sidewall of this groove is formed by a profile 42, which is snapped on an outer side of the sealing profile 39 and consists of a material that is not as easily deformable as the rubber of the sealing profile 39, e.g. of a thin-walled metal sheet or a rigid-elastic plastic, as well as a sealing lip 43 that is fastened on the inner side of the profile 42 and faces the window pane 12.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A vehicle door comprising:
   a door box having a first wall that has a first upper edge at which the first wall terminates and a second wall that has a second upper edge at which the second wall terminates; and
   a window frame module including a window frame defining a window opening above the door box, a first window shaft reinforcement defining a first groove receiving the first upper edge and a second window shaft reinforcement defining a second groove receiving the second upper edge, wherein the first and second window shaft reinforcements and the window frame are connected together as a structural unit, wherein the first groove opens outward away from the second window shaft reinforcement and the second groove opens downward.

2. The vehicle door according to claim 1, wherein the first window shaft reinforcement comprises a first vertical web projecting above the first wall and the second window shaft reinforcement comprises a second vertical web projecting above the second wall.

3. The vehicle door according to claim 1, wherein the second window shaft reinforcement is adhesively connected to the second upper edge.

4. The vehicle door according to claim 1, wherein the first window shaft reinforcement further comprises a lower region that terminates at a flange that is adhesively connected to the first wall.

5. The vehicle door according to claim 4, wherein the first upper edge extends above the upper edge of the second wall.

6. The vehicle door according to claim 5, wherein the second upper edge extends above the flange of the first window shaft reinforcement.

7. The vehicle door according to claim 4, wherein the first window shaft reinforcement comprises a wall region defining an elongated hollow space together with the first wall between the first groove and the flange.

8. The vehicle door according to claim 7, wherein the first window shaft reinforcement further comprises ribs integrally molded on the wall region and protruding into the hollow space.

9. The vehicle door according to claim 4, wherein the door box further comprises first and second end plates connected to the first and second window shaft reinforcements, wherein the first and second end plates extend downward below the first and second window shaft reinforcements and are connected to the door box securing the window frame module to the door box.

10. The vehicle door according to claim 1, wherein the first groove is defined by upper and lower walls of the first window shaft reinforcement and the second groove is defined by inner and outer walls of the second window shaft reinforcement.

11. The vehicle door according to claim 1, wherein the window frame module is configured to pivot about the first upper edge when the first upper edge is received in the first groove.

12. The vehicle door according to claim 11, wherein the window frame module is configured to pivot about the first upper edge as the second upper edge is received in the second groove.

13. The vehicle door according to claim 12, wherein the first upper edge is disposed horizontal and the second upper edge is disposed vertical.

14. The vehicle door according to claim 13, wherein the window frame module comprises a one-piece, injection-molded component.

15. The vehicle door according to claim 1, wherein the door box defines an interior, and wherein the window shaft reinforcements form a hollow space that is open toward the interior of the door box.

16. A vehicle door comprising:
a door box having a first wall terminating at a first upper edge that is disposed horizontally and a second wall terminating at a second upper edge that is disposed vertically the first upper edge disposed higher than the second upper edge; and
a window frame module including a window frame defining a window opening above the door box, a first window shaft reinforcement defining a first groove receiving the first upper edge and a second window shaft reinforcement defining a second groove receiving the second upper edge, the first groove defined by an upper wall and a lower wall of the first window shaft reinforcement and the second groove defined by an inner wall and an outer wall of the second window shaft reinforcement, wherein the first and second window shaft reinforcements and the window frame are connected together in the window frame module as a structural unit configured to connect with the door box.

17. The vehicle door according to claim 16, wherein the window frame further comprises:
a channel-shaped section that opens in an outward direction;
an L-shaped section connected to the channel-shaped section;
a strip of fabric embedded in the channel shaped section and in the L-shaped section; and
a sealing profile attached to the L-shaped section and having a U-shaped section with an elastic metal profile embedded in the U-shaped section, and a sealing lip disposed on the sealing profile.

* * * * *